July 8, 1969   G. DURST ETAL   3,454,445
METHOD OF BONDING A COMPLETELY IMIDIZED
PREFORMED POLYIMIDE LAYER TO METAL
Filed April 19, 1965
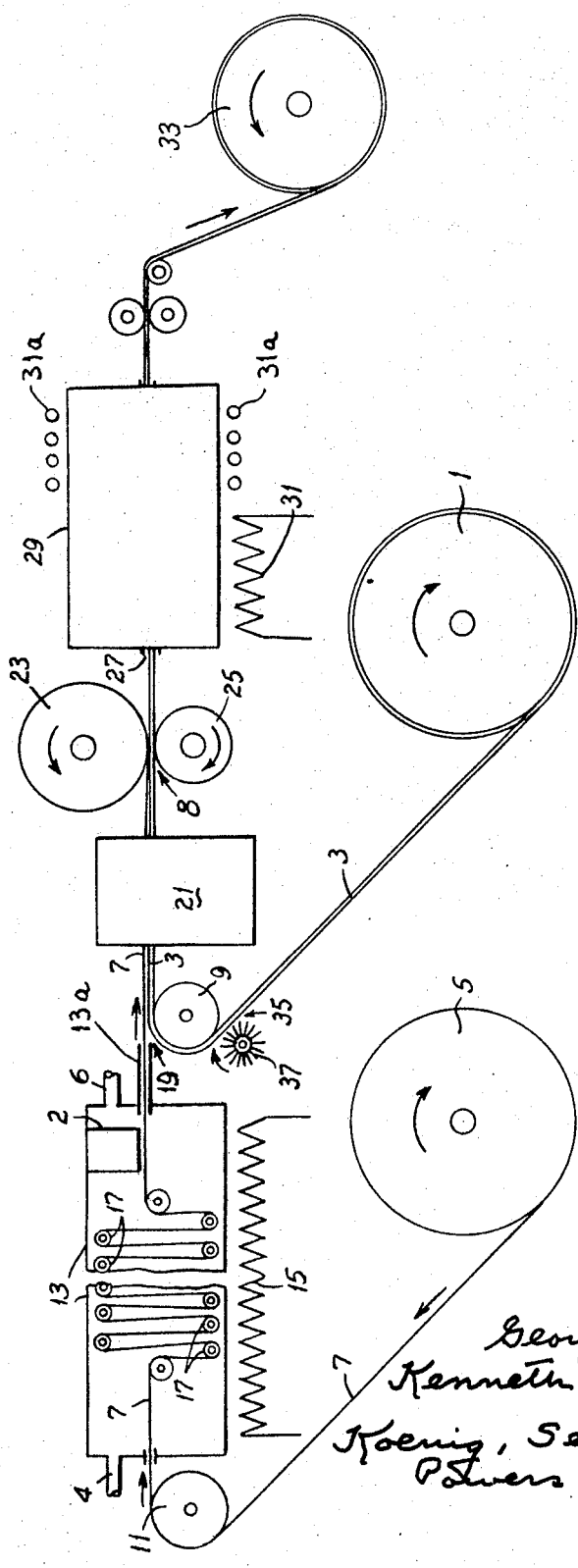
George Durst,
Kenneth E. Schneider,
  Inventors.
Koenig, Senniger,
  Powers and Leavitt,
    Attorneys.

United States Patent Office 3,454,445
Patented July 8, 1969

---

3,454,445
METHOD OF BONDING A COMPLETELY IMIDIZED PREFORMED POLYIMIDE LAYER TO METAL
George Durst and Kenneth E. Schneider, Attleboro, Mass., assignors to Texas Instruments Incorporated, Dallas, Tex., a corporation of Delaware
Filed Apr. 19, 1965, Ser. No. 448,920
Int. Cl. B32b 25/08, 27/34
U.S. Cl. 156—306  3 Claims

ABSTRACT OF THE DISCLOSURE

A 1–15 mil uncoated self-supporting strip of a completely polymerized linear polyimide polymer having a high molecular weight is bonded to a clean strip of metal by first baking the polymer strip at a temperature in the range of 250° F. to 750° F., then engaging it with the metal strip. The two strips are then rolled together under pressure to effect a reduction in thickness of the composite in the range of 5 to 10%, both strips being reduced during the reduction so as to green bond them across their interface. Then the reduced composite is sintered by heating in the range of 250° F. to 750° F., to improve the green bonds.

---

This invention relates to the bonding of synthetic resin to metal, and with regard to certain more specific features, to the bonding of a layer or film composed of a high-molecular-weight polyimide polymer with a metal base.

Among the several objects of the invention may be noted the provision of a product having a strong bond between a metal sheet and a tough high-molecular-weight polyimide polymer film; the provision of such a product which has wide use in the electrical and mechanical arts where physical and chemical stability, and also high mechemical and dielectric strength, are required under widely varying conditions of temperature and corrosion; the provision of an improved method and apparatus for producing a metal strip with a bonded film of a polyimide polymer to form an improved multi-layer product; and the provision of a method of the class described which provides for the low-cost manufacture of such a product. Other objects and features will be in part apparent and in part pointed out hereinafter.

The invention accordingly comprises the elements and combinations of elements, materials and combinations of materials, the proportions thereof, steps and sequence of steps, features of construction, composition and manipulation, and arrangements of parts which will be exemplified in the constructions, products and methods hereinafter described, and the scope of which will be indicated in the following claims.

In the accompanying drawing, the single figure schematically illustrates certain steps employed in carrying out the invention.

The invention accomplishes bonding by performing a series of steps on a high-molecular-weight polyimide polymer film on a metal strip to bring about a strong bond therebetween without the use of intermediate adhesive material. The resulting composite product has superior properties of heat resistance, resistance to corrosion, mechanican strength and dielectric strength over a wide range of temperatuers and corrosive conditions.

A high-molecular-weight polyimide polymer film useful in carrying out the invention has been developed and is manufactured by the E. I. du Pont de Nemours and Co. Inc. of Wilmington, Del., and sold under the trade name of "H-film." It will be understood that other high-molecular-weight polymers having equivalent properties amenable to our process may also be used in practice. It will also be understood that while we disclose a continuous manufacturing process, batch-processing is not precluded.

The high-molecular-weight polyimide polymers useful in the practice of the invention are, for example, prepared by reacting pyromellitic dianhydride with an aromatic diamine such as bis(4-aminophenyl) ether, to yield a polyamic acid which is then dehydrated to yield a high-molecular-weight polyimide polymer. As a specific example of the preparation of a high-molecular-weight polyimide polymer, equivalent amounts of pyromellitic dianhydride and bis(4-aminophenyl) ether are stirred together in dimethylacetamide for one hour at room temperature to form poly[N,N' - (p,p' - oxydiphenylene) pyromellitamic acid]. A solution of this acid is spread onto dry glass plates and dried under nitrogen, and the films which form are then further dried under vacuum. When their solids content reaches about 70%, the films are heated at 300° C. for an hour to convert the acid to the high-molecular-weight polyimide, poly[N,N'-(p,p'-oxydiphenylene)pyromellitimide] of the following formula:

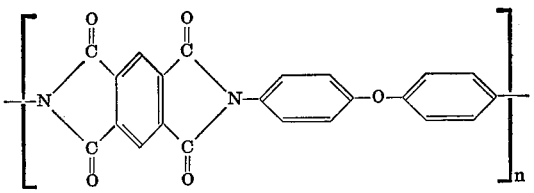

Polymer films of the above type are tough, have high tensile strength, high dielectric strength, with high thermal and chemical stability, and do not melt. For example, such a film, called "H-film" has a tensile strength of approximately 25,000 p.s.i. at room temperature; approximately 10,000 p.s.i. at 300° C.; and approximately 4,500 p.s.i. at 500° C. Thus it is a substance which has strength superior to, for example, polyethylene, the strength of which is only 2,500 p.s.i. at room temperature. It will not undergo major degradation at 500° C. It is insoluble in commonly used solvents and does not oxidize readily even at high temperatures over long periods. Radiation has little effect upon it.

Referring now to the drawing, numeral 1 indicates a supply winding of a strip 3 of a suitable metal such as, for example, so-called alloy B. Its thickness is not critical and may range from a few mils up. It should preferably, though not necessarily, be coilable. Alloy B is an alloy consisting of approximately 22% nickel, 3% chromium and the balance iron. At numeral 5 is shown a supply winding of a thin strip or film 7 of the high-molecular-weight polyimide polymer above mentioned. It should preferably be in the film form, i.e., from one to fifteen mils thick. Guide roll 11 serves to direct the film 7 into a baking and dust-sweeping chamber 13. A conventional heater for chamber 13 is shown at 15.

The length of the chamber 13 may be such that the time required for heating and the time required for passage of the film 7 through the chamber 13 are the same. To this end the film may be looped over a suitable number of rollers in chamber 13 such as shown at 17, to increase the time of passage of a given part of it through the chamber over what the time would be if the film passed straight through. Further details concerning means associated with the chamber 13 to remove dust are not necessary, inasmuch as there are various means for accomplishing this, such as a blower or electrostatic precipitator, which will be obvious to one skilled in the art. Such means are suggested at 2. The baking time may be reduced by employing a circulating dry gas or a partial vacuum in chamber 13. Ports for this purpose are shown at 4 and 6.

After the film 7 leaves the chamber 13, it meets but does not contact the strip 3 at 19 where it runs parallel to strip 3 until they contact at roll bite 8. Both then pass through suitable independent back-tensioning means indicated at 21. Details of the back-tensioning means will not be required because such are known to those skilled in the art. It will be understood that means 21 permits individual adjustment of the back tension on each of strip 3 and film 7. It will be further understood that if desired, suitable guide means for strip 3 and film 7 may be provided.

From the back-tensioning means 21, the strip 3 and film 7 enter the bite between draw and squeeze rolls 23 and 25, where they are squeezed together under a substantial pressure to reduce the aggregate thickness of the two strips in the range of from 5 to 10% but preferably 6 to 7.5%. At 27 the bonding strips enter a heating or sintering and cooling chamber 29. A heater for the sintering and cooling chamber 29 is indicated at 31. After the bonded material emerges from the chamber 29, it is drawn up into a coil 33. In the chamber 29, the hot bonded material is prevented from distorting into shapes leaving undesirable stresses on cooling.

Chamber 29 is also provided with cooling means 31A for cooling the bonded material before it is released to the atmosphere.

In some cases it may be desirable to effect squeezing by the rolls 23 and 25 at such speeds as might lead to excessively large sizes of the heating and sweep chamber 13 and of the heating or sintering chamber 29 in order to gain heating time. In such cases baking and dust removal may be performed in a separate preliminary step and final heating performed in a separate heating step. Thus film 7 may be withdrawn in a dust-free condition from a coil in a heated dust-free cassette and, after passing between rolls 23 and 25, immediately coiled and sent to a suitable heating furnace in the coil form for final heating or sintering. This would in effect constitute a batch, rather than a continuous process.

Referring to the metal strip 3, it should be made quite clean, as by wire-brushing, immediately before bonding. Such brushing may be accomplished before the time that it is placed in the form of the coil 1. Or brushing may be accomplished at a point such as 35 by a wire brush 37. Slight oxide films, if only freshly produced on clean metal surfaces, are permissible. It is preferred however that, after brushing, the strip 3 reach the rolls 23 and 25 with as little oxide formation as possible. If desired, film 7 may be protected from dust by duct or enclosure 13a. To give an example of the significance of this, the polyimide polymer film on freshly brushed alloy B yields a relatively weak so-called green bond after rolling and a very strong final bond after sintering. On the other hand, the green bond on alloy B when oxidized to purplish to blue before bonding, is stronger but the final sintered bond is somewhat weaker but not intolerably so.

The back-tensioning means 21 assures that the film will properly enter between the rolls. The reduction that occurs in passing between the rolls is not simply for bringing the resulting composite material down to the desired finished size, although this may occur. Rather, the reduction is in the range of 5 to 10% which, after the baking step in chamber 13, has an important effect upon producing what is called the green bond between the film 7 and the metal strip 3, and which by the later heating or sintering treatment in chamber 29 may be developed into a very strong bond which is superior to former bonds between plastics and metals. Thus some of the desired effect is in part due to the baking step which occurs in the sweep chamber 13. In this chamber, baking for several minutes, preferably at 250° F. to 750° F., places the film in a condition for this green-bonding effect under the range of reductions stated. A preferred range is 400° F. to 500° F. for baking. Without baking for a suitable time prior to reduction, the superior effects of our process are not obtained.

The final heating step which occurs in the chamber 29 is referred to as a sintering step. This step is also preferably carried out in a temperature range of from 250° F. to 750° F., with 400° F. to 500° F. preferred, for a period on the order of a few seconds as, for example, 30 seconds or more. The sintering step may be carried out without any special atmospheric requirements other than the usual ones that may be desirable to protect the back of the metal strip 3 from oxidation, if such oxidation is for any reason undesirable.

In the bonding pass, the film 7 should not be reduced in percentage of thickness appreciably more, if any, than the metal strip 3, to avoid mechanical damage to the film. Thus, for example, if the over-all reduction is to be 10% of the composite thickness of film 7 and strip 3, the maximum reduction for the film alone should be about 10%.

We have found that the green-bonding is to some degree affected by the amount of traction that the upper roll 23 exerts on the film 7. This may be controlled in several ways, either individually or in combination. Thus the rolls may be made of different diameters with the larger of the two (i.e., roll 23) engaging the film 7. Appropriate diameters of the rolls 23 and 25 are 7 and 5 inches, respectively, although this is not limiting. Or the upper roll 23 may have a higher surface speed and/or may be rougher than the lower roll 25. Thus upper roll 23 may be sand-blasted and the lower roll left smooth. Or the upper roll may be treated with rosin by dissolving it in alcohol or trichlorethylene and then applying the solution to the roll. The solvent evaporates rapidly and disappears.

The above arrangements for traction on film 7 facilitate the introduction of the film into the roll bite at 8, so as to reduce back-extrusion of the film while the film and the strip undergo reduction in thickness. An appropriate temperature for the rolls 23, 25 is room temperature or somewhat above. For best results, 200° F. should not be exceeded.

While we do not know the reasons for the importance of the above-described baking and sintering steps, they are in fact both important to the effectiveness of the process and the bond strength of the finished product. As to the baking step, it may be that it has some effect by removal of water and/or plasticizer from the film 7, the presence of which during roll squeezing might prevent effective green bonding. As to the sintering step, it may relieve stresses in the film which, if left in the film after reduction, might leave it only in the green-bonded state. However, regardless of any theory, these steps are significant. It may also be mentioned that the hardness and ductility of the metal strip 3 are factors in the process. Too soft a metal elongates excessively and tends to tear the thinner polyimide polymer film 7. An illustration of this is that fully annealed copper or brass cannot be well bonded to the film. However, by hardening such metals, they can be used. As an example, 50% cold-worked 70/30 brass is very well suited to the process. Soft metals elongate so much upon reduction during squeezing between the rolls 23 and 25 that the film 7 can become unduly stretched or torn.

Advantages, besides those above mentioned, are that the bonding step between the rolls 23 and 25 is performed in a comparatively cold condition, or at least a solid condition of both the metal strip 3 and polyimide film 7. While we do not know the exact physical nature of the bond, we have observed that the pressures brought about by the 5 to 10% reduction between the bonding rolls 23 and 25 is important to success. The appropriate reduction is one that produces high pressure short of a pressure involving an elongation that might damage the polyimide polymer film, which while in some respects is as tough as many a metal or alloy, is not quite as ductile. Therefore, higher reductions such as used in cold-bonding of metals are neither necessary nor desirable, as, for example, 50 to 65%. Thus, the reduction to produce the green bond is much smaller than that used for cold-bonding of metals. If higher reductions such as used for metals (i.e., 50 to 65%) were required, the film would tend to tear, rather than to form a green bond.

The importance of the dust removal is to minimize the loss of dielectric strength, which comes about when dust is left on the film 7 and rolled into it between rolls 23 and 25.

It will be understood that while the case is illustrated wherein the strip 3 is clad only on one side with the film 7, it may be clad on both sides by suitable modifications which will be clear to those skilled in the art.

The invention has a broad range of applications. For example, the product may be used as a well-bonded substrate for printing electric resistor films. Or, for example, copper strip carrying a bonded layer of the film may be used for transformer windings, insulation for prefabricated electrical parts, antifriction applications combined with electrical insulation, and the like.

In view of the above, it will be seen that the several objects of the invention are achieved and other advantageous results attained.

As various changes could be made in the above constructions, products and methods without departing from the scope of the invention, it is intended that all matter contained in the above description or shown in the accompanying drawings shall be interpreted as illustrative and not in a limiting sense.

What is claimed is:

1. The method of bonding a metal layer and a completely polymerized preformed self-supporting thin layer of a linear completely imidized polyimide polymer having a high-molecular weight, comprising baking the polymer layer at a temperature in the range of substantially 250–750° F., contacting the metal layer directly with a layer of the baked polymer layer, squeezing the contacted layers to effect a reduction in the combined thickness of the layer, each layer of the composite being reduced, whereby the layers are green bonded, and sintering the green bonded composite at a temperature in the range of substantially 250–750° F., said metal having a hardness and ductility such that during said reduction by squeezing it will not elongate sufficiently to tear the said baked polymer and which will remain solid during said sintering step.

2. The method of bonding a metal strip and a completely polymerized preformed self-supporting uncoated strip of a completely imidized linear polyimide polymer having a high-molecular weight and of a thickness in the range of approximately 1–15 mils, comprising baking the polymer strip at a temperature in the range of 250–750° F., advancing the metal strip in direct contact with a strip of the baked polymer to a squeezing station, squeezing the strips at said station to effect a reduction in the combined thickness of the layers in the range of substantially 5–10%, each strip of the composite being reduced, the reduction in the polymer strip not to exceed the reduction in the metal strip, and sintering the composite strip at a temperature in the range of 250–750° F., said metal having a hardness and ductility such that during said reduction by squeezing it will not elongate sufficiently to tear said baked polymer and which will remain solid during said sintering step.

3. The method of bonding a metal strip and a completely polymerized preformed uncoated self-supporting strip of a completely imidized linear polyimide polymer having a high-molecular weight and of a thickness in the range of approximately 1 to 15 mils, said polymer being characterized by the formula:

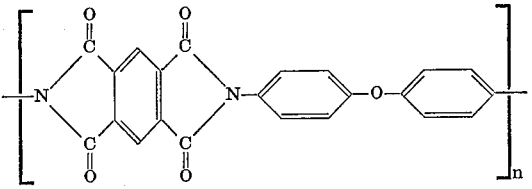

comprising: baking the polymer strip at a temperature in the range of 250° F. to 750° F., advancing the metal strip in direct contact with a strip of the polymer to a squeezing station, squeezing the strips at said station to effect a reduction in the combined thickness of the strips in the range of 5–10%, each layer of the composite being reduced, the percentage reduction in the thickness of the polymer strip not substantially to exceed that of the metal strip, thereby to effect a green bond between the strips, and sintering the green-bonded composite at a temperature in the range of 250° F. to 750° F. to convert the green bonds into stronger bonds, said metal having a hardness and ductility such that during said reduction by squeezing it will not elongate sufficiently to tear said baked polymer and which will remain solid during said sintering step.

References Cited

UNITED STATES PATENTS

| 3,179,634 | 4/1965 | Edwards | 260—78 |
|---|---|---|---|
| 3,179,635 | 4/1965 | Frost et al. | 260—78 |
| 3,282,898 | 11/1966 | Angelo | 260—47 |
| 3,312,663 | 4/1967 | Sorenson | 260—47 |
| 3,326,851 | 6/1967 | Tocker | 260—47 |
| 3,371,009 | 2/1968 | Traynor et al. | 161—227 |
| 2,424,558 | 7/1947 | Delano | 156—555 |
| 2,972,369 | 2/1961 | Jensen | 156—324 |
| 3,042,568 | 7/1962 | Ludowici et al. | 156—494 |
| 3,047,934 | 8/1962 | Magner | 156—324 |
| 3,179,630 | 4/1965 | Endrey | 260—78 |
| 3,354,015 | 11/1967 | Klusmire et al. | 156—244 |
| 3,361,589 | 1/1968 | Lindsey | 156—308 |

EARL M. BERGERT, *Primary Examiner.*

W. E. HOAG, *Assistant Examiner.*

U.S. Cl. X.R.

156—324; 161—214, 219